(12) United States Patent
Simon et al.

(10) Patent No.: US 11,654,766 B2
(45) Date of Patent: May 23, 2023

(54) HYBRID MODULE INCLUDING STAMPED ROTOR CARRIER

(71) Applicant: Schaeffler Technologies AG & Co. KG, Herzogenaurach (DE)

(72) Inventors: Timothy Simon, Wooster, OH (US); David Brucato, Ashland, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1128 days.

(21) Appl. No.: 15/971,092

(22) Filed: May 4, 2018

(65) Prior Publication Data
US 2019/0337375 A1 Nov. 7, 2019

(51) Int. Cl.
| | |
|---|---|
| *B60K 6/26* | (2007.10) |
| *B60K 6/405* | (2007.10) |
| *H02K 7/00* | (2006.01) |
| *H02K 1/02* | (2006.01) |
| *H02K 1/28* | (2006.01) |
| *H02K 1/2706* | (2022.01) |
| *B60K 6/48* | (2007.10) |

(52) U.S. Cl.
CPC ............... *B60K 6/26* (2013.01); *B60K 6/405* (2013.01); *H02K 1/02* (2013.01); *H02K 1/28* (2013.01); *H02K 7/006* (2013.01); *B60K 2006/4825* (2013.01); *B60Y 2400/426* (2013.01); *H02K 1/2706* (2013.01)

(58) Field of Classification Search
CPC .. B60K 6/26; B60K 6/405; B60K 2006/4825; B60K 6/387; B60K 6/40; B60K 6/48; H02K 1/02; H02K 1/2706; H02K 1/28; H02K 7/006; H02K 7/108; B60Y 2400/426; F16D 13/683; F16D 25/0638; Y02T 10/62

USPC .......................................................... 310/78
See application file for complete search history.

(56) References Cited

U.S. PATENT DOCUMENTS

| | | | | |
|---|---|---|---|---|
| 4,339,873 A | * | 7/1982 | Kanamaru | F16D 1/072 29/598 |
| 4,377,762 A | * | 3/1983 | Tatsumi | F16D 1/072 310/263 |
| 7,318,403 B1 | * | 1/2008 | Huart | B60L 50/16 123/179.28 |

(Continued)

FOREIGN PATENT DOCUMENTS

| | | |
|---|---|---|
| CN | 102725161 A | 10/2012 |
| CN | 103580380 A | 2/2014 |

(Continued)

OTHER PUBLICATIONS

Search Report and Written Opinion for corresponding PCT application.

*Primary Examiner* — Alex W Mok
(74) *Attorney, Agent, or Firm* — Davidson, Davidson & Kappel, LLC

(57) ABSTRACT

An electric motor includes a stator, a rotor and a rotor carrier radially inside of the rotor non-rotatably fixed to the rotor. The rotor carrier includes an axially extending cylindrical section including an outer circumferential surface having an annular groove formed therein. A method of forming a rotor carrier includes forming, by stamping, a rotor carrier including an axially extending cylindrical section including an outer circumferential surface having annular groove formed therein.

19 Claims, 5 Drawing Sheets

(56) References Cited

U.S. PATENT DOCUMENTS

| | | | |
|---|---|---|---|
| 2004/0045752 A1* | 3/2004 | Omote | B60K 6/26 |
| | | | 180/65.26 |
| 2004/0173393 A1 | 9/2004 | Man et al. | |
| 2011/0240430 A1* | 10/2011 | Iwase | B60K 6/26 |
| | | | 192/3.29 |
| 2012/0242199 A1* | 9/2012 | Iwase | H02K 7/006 |
| | | | 310/68 B |
| 2012/0299404 A1* | 11/2012 | Yamamoto | H02K 1/32 |
| | | | 310/61 |
| 2012/0319514 A1 | 12/2012 | Iwase et al. | |
| 2013/0086798 A1* | 4/2013 | Frait | B60K 6/48 |
| | | | 29/596 |
| 2014/0030123 A1 | 1/2014 | Fuechtner et al. | |
| 2015/0239336 A1* | 8/2015 | Kasuya | B60L 50/16 |
| | | | 74/661 |
| 2015/0244217 A1* | 8/2015 | Shimamori | H02K 1/28 |
| | | | 310/156.12 |
| 2015/0285137 A1 | 10/2015 | Luetzow et al. | |
| 2015/0357871 A1* | 12/2015 | Kim | B29C 65/48 |
| | | | 310/51 |
| 2016/0105060 A1* | 4/2016 | Lindemann | H02K 1/27 |
| | | | 701/22 |
| 2016/0109010 A1* | 4/2016 | Lindemann | F16H 41/28 |
| | | | 192/3.21 |
| 2017/0122421 A1* | 5/2017 | Frait | F16D 33/18 |
| 2017/0133896 A1 | 5/2017 | Won | |
| 2017/0194833 A1* | 7/2017 | Bang | A47L 9/22 |
| 2017/0324290 A1 | 11/2017 | Chamberlin et al. | |

FOREIGN PATENT DOCUMENTS

| | | |
|---|---|---|
| CN | 104870822 A | 8/2015 |
| CN | 105805302 A | 7/2016 |
| JP | 2007336646 A | 12/2007 |
| KR | 1020110090191 A | 8/2011 |

* cited by examiner

HYBRID MODULE INCLUDING STAMPED ROTOR CARRIER

The present disclosure relates generally to electric motor rotors and more specifically to electric motor rotors in hybrid modules.

BACKGROUND

Hybrid motor vehicle drive trains include hybrid modules having electric motor rotor carriers that are formed in a conventional manner by casting. FIG. 1 shows a perspective view of a rotor carrier 110 formed by casting. The rotor carrier 110 includes a plurality of axially extending teeth 112 protruding radially outward from a radially outer base surface 114 of rotor carrier 110. Teeth 112 are configured to define axially extending grooves for fluid flow.

U.S. Pub. No. 2016/0105060A1 shows a hybrid module including a conventional rotor carrier.

SUMMARY OF THE INVENTION

An electric motor includes a stator, a rotor and a rotor carrier radially inside of the rotor non-rotatably fixed to the rotor. The rotor carrier includes an axially extending cylindrical section including an outer circumferential surface having an annular groove formed therein.

In embodiments, the electric motor may include a first portion, a second portion and a third portion, with the second portion being axially between the first portion and the third portion and the annular groove being formed at the second portion. The first portion, the second portion and the third portion may be of approximately a same thickness. At least one of the first portion and the third portion may include a notch formed in the outer circumferential surface, with the notch non-rotatably connecting the rotor carrier to the rotor. The at least one of the first portion and the third portions including the notch may include a radially outer circumferential surface portion circumferentially adjacent to and offset radially outwardly from the notch. The radially outer circumferential surface portion is formed by at least one arc. The notch may be a plurality of notches and the at least one arc may be a plurality of arcs. Each of the first portion and the third portion may include at least two of the plurality of notches and at least two of the plurality of arcs. The notch may be formed as a flat. The second portion may extend radially inward further than the first portion and the third portion. An inner circumferential surface of the second portion may include teeth or splines. The third portion forms a free end of the rotor carrier and the rotor carrier includes a radially extending section adjoined to the first portion.

A hybrid module configured for arrangement in the torque path upstream from a transmission and downstream from an internal combustion engine is also provided. The hybrid module includes the electric motor and a clutch including at least one clutch plate non-rotatably connected to the rotor carrier directly radially inside of the annular groove. The rotor carrier may include a radially extending section at an axial end of the axially extending cylindrical section. The hybrid module may further include a torque converter including a front cover. The rotor carrier may be fixed to the torque converter by fasteners passing through the radially extending section of the rotor carrier. The hybrid module may further include an input shaft configured for connecting to the internal combustion engine. The clutch may be configured for selectively connecting torque converter to the input shaft or disconnecting the torque converter from the input shaft.

A method of forming a rotor carrier is also provided. The method includes forming, by stamping, a rotor carrier including an axially extending cylindrical section including an outer circumferential surface having annular groove formed therein.

In embodiments of the method, the axially extending cylindrical section may include a first portion, a second portion and a third portion, with the second portion being axially between the first portion and the third portion, the annular groove being formed at the second portion. The first portion, the second portion and the third portion may be of approximately a same thickness before and after the stamping. The forming of the rotor carrier may include stamping a notch into the outer circumferential surface in at least one of the first portion and the third portion.

A method of forming a hybrid module is also provided. The method includes forming the rotor carrier, non-rotatably connecting the rotor carrier to a rotor, of an electric motor and fixing the rotor carrier to a cover of a torque converter. The torque converter may include a turbine and an impeller configured for driving the turbine via fluid flowing from the impeller to the turbine. The method may include non-rotatably fixing at least one clutch plate to an inner circumferential surface of the axially extending section of the rotor carrier directly radially inside of the annular groove. The cover of the torque converter may include a front cover. The rotor carrier may include a radially extending section at an axial end of the axially extending section. The fixing of the rotor carrier to the cover may include fixing the front cover to the radially extending section via fasteners.

BRIEF DESCRIPTION OF THE DRAWINGS

The present invention is described below by reference to the following drawings, in which:

FIG. 3b shows a perspective view of the rotor carrier shown in FIG. 3a; and

DETAILED DESCRIPTION

The present disclosure provides a method of forming a rotor carrier by stamping, instead of by casting, which results in a heavy rotor carrier having porosity issues. Forming a rotor carrier by stamping eliminates porosity issues and reduces the weight of the rotor carrier in comparison with cast rotor carriers. In order to form the stamped rotor carrier, an indent is added to move material from an outside of the part to an inside. This moved material can then be broached to create an inside spline. This movement of material also allows a same material thickness to be used through the part, where the cast needs to be thicker which increases weight.

Figure 1:
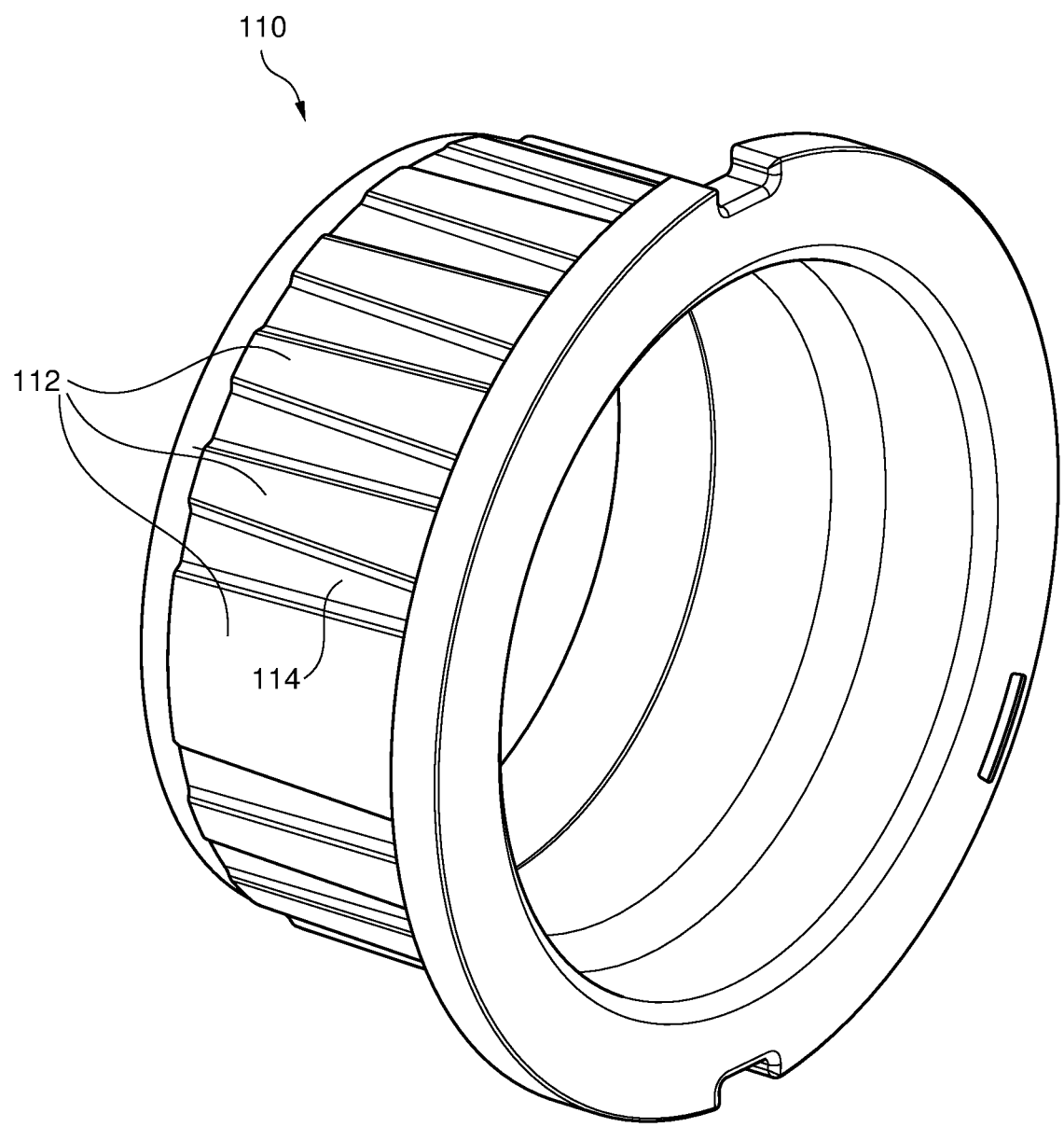
FIG. 1 shows a perspective view of a rotor carrier formed by a conventional casting technique.
Figure 2:
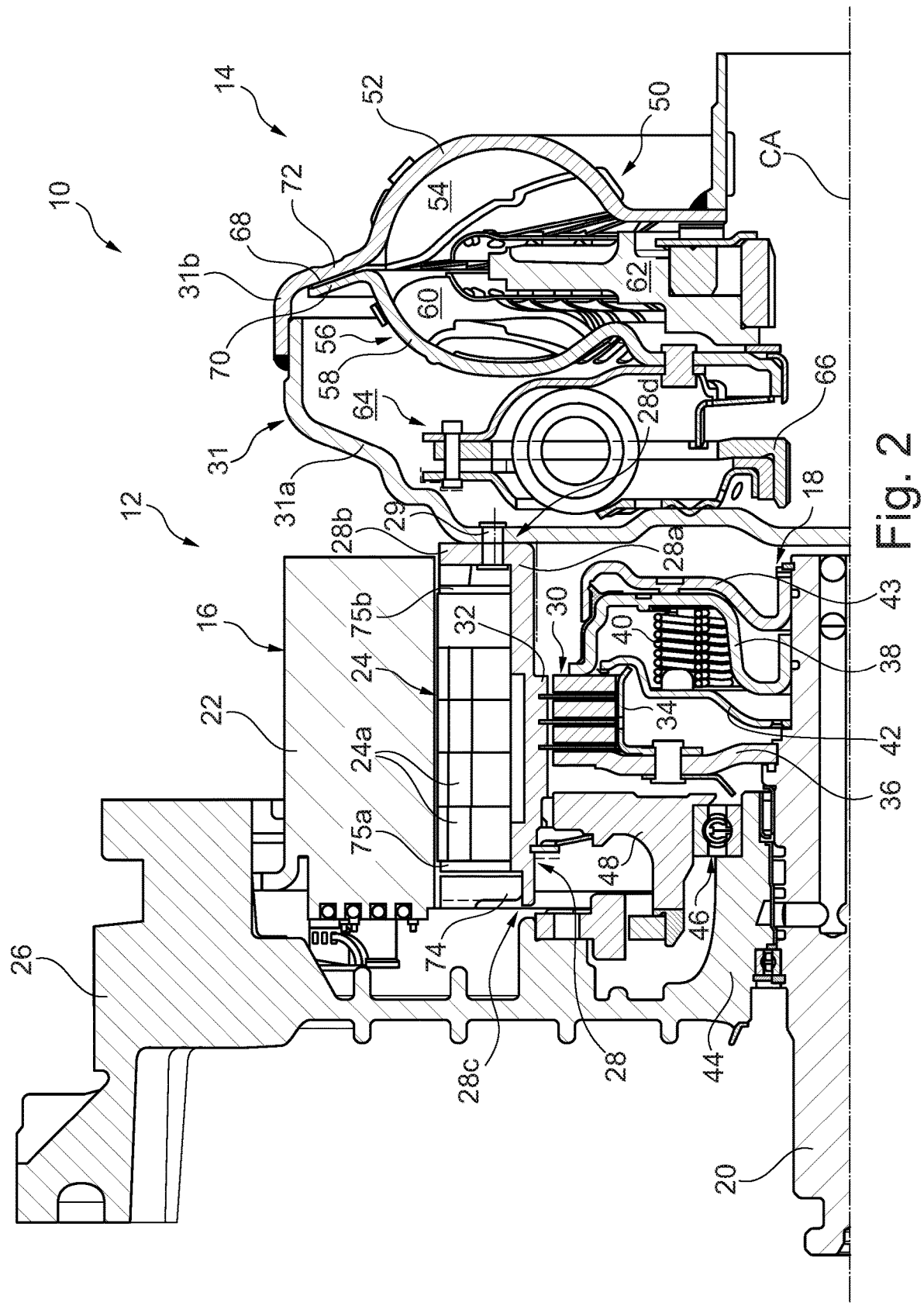
FIG. 2 shows a hybrid module in accordance with an embodiment of the present invention.

FIG. 2 shows hybrid module 10 in accordance with an embodiment of the present invention. Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for non-rotatably connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid drive unit 12. Upon current being provided to coils of stator 22, rotor 24 is rotated about a center axis CA of hybrid module 10 in a known manner, due to rotor 24 including a plurality of permanent magnet segments 24a that are energized by the current in the coils. The terms axially, radially and circumferentially as used herein are used with respect to center axis CA. Magnet segments 24a are supported at their inner circumferences by a rotor carrier 28. Rotor carrier 28 includes a cylindrical axially extending section 28a supporting the inner circumferences of magnet segments 24a and a radially extending section 28b protruding radially outward from an end of axially extending section 28a. Torque converter 14 is fixed to hybrid drive unit 12 at radially extending section 28b of rotor carrier 28 by a plurality of fasteners 29 passing through a cover 31 of torque converter 14.

Clutch 18 includes a plurality of clutch plates 30, at least some of which are supported in an axially slidable manner at outer diameter ends thereof by splines or teeth 32 formed on an inner circumferential surface of axially extending section 28a. At least one of clutch plates 30 is supported in an axially slidable manner at inner diameter ends thereof by an inner support 34 that is fixed to a counter pressure plate 36, which is nonrotatably fixed to shaft 20. Clutch 18 further includes a piston 38 that is axially slidable along an outer circumference of shaft 20 to engage and disengage clutch 18 based on fluid pressure differences on front and rear sides of piston 38. When piston 38 forces clutch plates 30 against counter pressure plate 36, clutch 18 is engaged and torque from shaft 20 is transmitted through clutch plates 30 into rotor carrier 28, which then transmits the received torque to damper assembly 64. Piston 38 is held axially away from clutch plates 30 by a spring 40 supported by a support plate 42. Piston 38 is also resiliently connected to a liftoff control plate 43 that limits the liftoff of piston 38 with respect to clutch plates 30.

Housing 26 includes an axially extending protrusion 44 provided on an engine side of clutch 18 radially outside of shaft 20. Protrusion 44 supports a ball bearing 46, which rotatably supports a rotor flange 48 on protrusion 44. An inner race of ball bearing 46 sits on an outer circumferential surface of protrusion 44 and rotor flange 48 extends from an outer circumferential surface of the outer race of ball bearing 46 to axially extending section 28a of rotor carrier 28.

Torque converter 14 includes a front cover 31a and a rear cover 31b together forming cover 31, with fasteners 29 passing axially through a radially extending section of front cover 31a, which extends radially inward to intersect center axis CA. Rear cover 31b includes forms an impeller shell 50 of an impeller 52 that includes a plurality of impeller blades 54, which are supported by a rounded blade supporting portion 50a of impeller shell 50, which is shaped as an annular bowl and contacts rear edges of impeller blades 54.

Torque converter 14 also includes a turbine 56 configured to define a piston that is axially moveable toward and away from impeller shell 50 such that an engagement section of turbine 56 engages an engagement section of impeller shell 50 so as to form a lockup clutch. Turbine 56 includes a turbine shell 58 supporting a plurality of turbine blades 60. Torque converter 14 also includes a stator 62 axially between turbine 56 and impeller 52 to redirect fluid flowing from the turbine blades 60 before the fluid reaches impeller blades 54 to increase the efficiency of torque converter 14. Torque converter 14 further includes a damper assembly 64 fixed to turbine shell 58. Damper assembly 64 is configured for receiving torque from turbine shell 58 and transferring torque to the transmission input shaft. For transferring torque to the transmission input shaft, damper assembly 64 includes a support hub 66, which includes a splined inner circumferential surface for non-rotatably connecting to an outer circumferential surface of the transmission input shaft.

A friction material 68 is bonded onto a radially extending impeller facing surface of an outer radial extension 70 of turbine shell 58, which is radially outside of blades 60 and forms the engagement section of turbine 56, for engaging a radially extending wall 72 of impeller shell 50, which is radially outside of blades 54 and forms the engagement section of impeller shell 50. In other embodiments, instead of or in addition to being bonded to outer radial extension 70, friction material 68 may be bonded to radially extending turbine facing surface of radially extending wall 72 or to one or more additional discs between radially extension 70 and wall 72. Regardless of whether friction material 68 is bonded to outer radial extension 70, radially extending wall 72 or one or more additional discs, friction material 68 is provided axially between extension 70 and wall 72 to selectively rotationally engage the engagement section of turbine piston 56 with the engagement section of impeller shell 50. Torque converter 14 receives torque input from hybrid drive unit 12 through fasteners 29 at front cover 31a, which is transmitted to impeller 52. Impeller 52 drives turbine 56 via fluid flow from impeller blades 54 to turbine blades 60, when the lockup clutch is disengaged, or via friction material 68, when the lockup clutch is engaged. Turbine 56 then drives damper assembly 64, which in turn drives the transmission input shaft.

Referring back to electric motor 16, it further includes a rotor clamping ring 74 fixed to axially extending section 28a for axially retaining rotor 24 on rotor carrier 28. Rotor clamping ring 74 is provided at a first or front axial end 28c of rotor carrier 28 that is opposite to a second or rear axial end 28d of rotor carrier 28 at which radially extending section 28b is provided, such that magnets 24a are clamped axially between section 28b and ring 74. A first non-ferrous plate 75a is provided axially between rotor 24 and ring 74 and a second non-ferrous plate 75b is provided axially between rotor 24 and section 28b. Plates 75a, 75b may be formed of aluminum and contact the rotor magnets to block eddy currents, which are essentially short circuits of the magnetic flux field and lead to low e-motor efficiency.

Figure 3A:
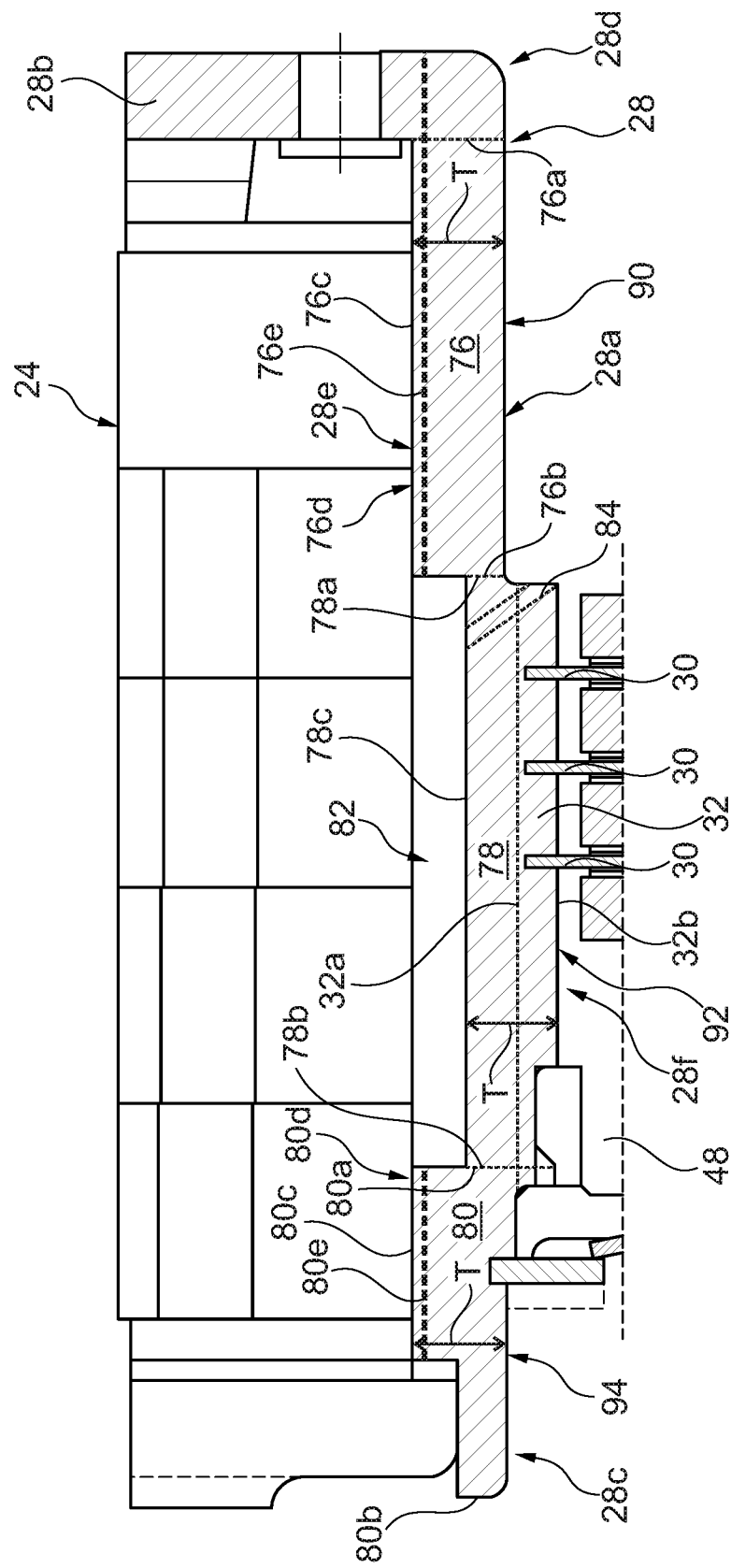
FIG. 3a shows an enlarged radial cross-sectional view of a rotor carrier of the hybrid module shown in FIG. 2.
Figure 3B:
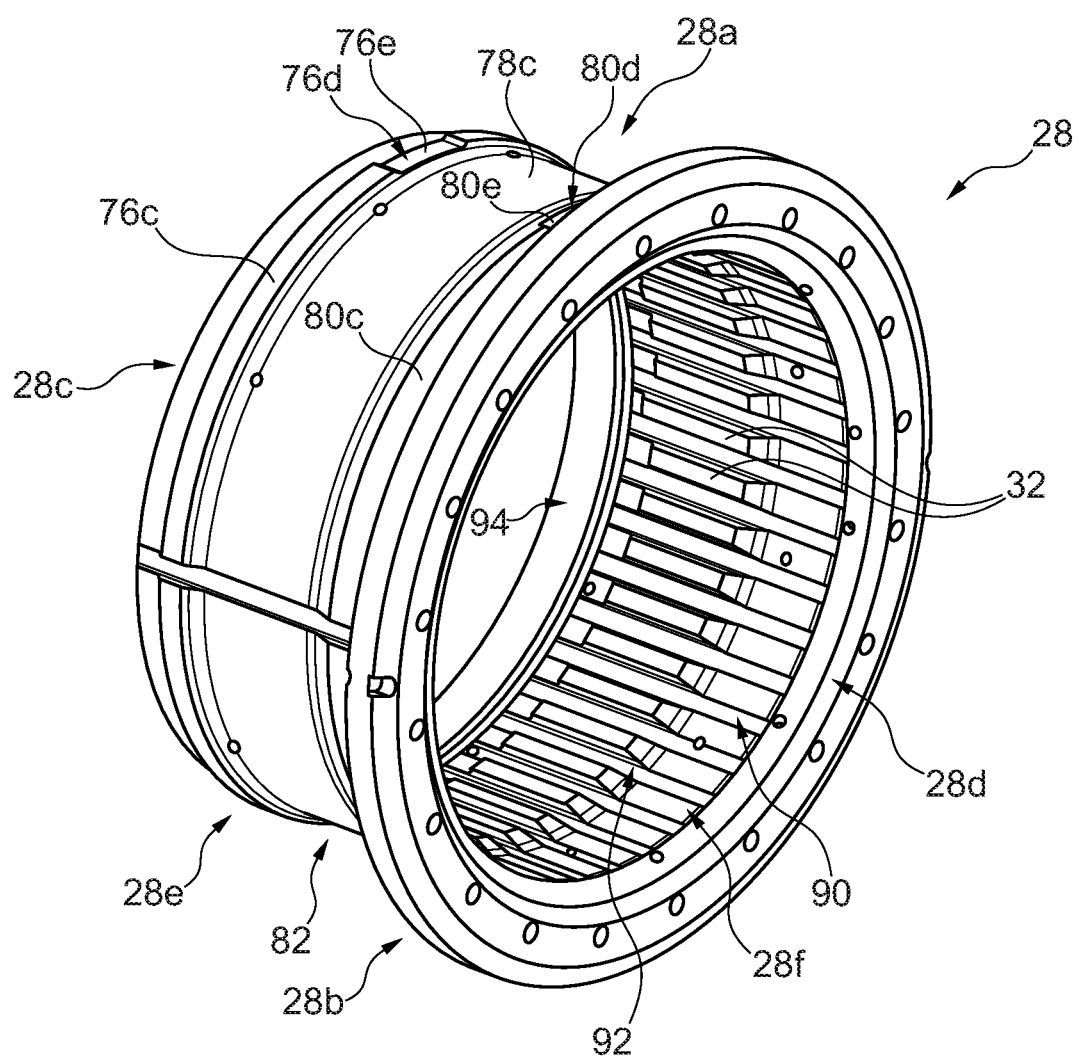

FIG. 3a shows an enlarged radial cross-sectional view of rotor carrier 28 and FIG. 3b shows a perspective view of rotor carrier 28, illustrating the configuration of splines 32 formed in second portion 78. Rotor carrier 28 is formed by stamping and includes a plurality of portions 76, 78, 80 forming axially extending section 28a. Axially extending section 28a includes a first or rearmost portion 76 extending axially in a frontward direction D1 from radially extending section 28b, a second or intermediate portion 78 extending in frontward direction D1 from first portion 76, and a third or frontmost portion 80 extending axially in frontward direction D1 from second portion 78. More specifically, a rear axial end 76a of first portion 76 joins radially extending section 28b, a rear axial end 78a of second portion 78 joins a front axial end 76b of first portion 76, a rear axial end 80a of third portion 80 joins a front axial end 78b of second portion 78 and a front axial end 80b of third portion 80 forms front axial end 28c, i.e., a free axial end, of axially extending section 28a. Portions 76, 78, 80 define both an outer circumferential surface 28e and an inner circumferential surface 28f of axially extending section 28a. First portion 76 includes a radially outer circumferential surface portion 76c of outer circumferential surface 28e, which is an outermost circumferential surface of first portion 76, and third portion 80 includes a radially outer circumferential surface portion 80c of outer circumferential surface 28e, which is an outermost circumferential surface of second portion 80. Second portion 78 includes a radially inner outer circumferential surface portion 78c of outer circumferential surface 28e, which is an innermost outer circumferential surface of second portion 78. Surface portions 76c, 80c are positioned radially outside of radially inner outer circumferential surface portion 78c such that second portion 78 forms an annular groove 82 between first portion 76 and third portion 80. Second portion 78 includes a radially extending channel 84 extending radially therethrough to feed fluid into groove 82 from radially inside of axially extending section 28a of rotor carrier 28 for cooling rotor 24 during operation of electric motor 16. Annular groove 82 extends continuously about center axis CA.

Each of first portion 76 and third portion 80 are provided with radially inner outer circumferential surface portions formed by at least one notch 76d, 80d, respectively, extending radially below the respective radially outer circumferential surface portion 76c, 80c. Notches 76d, 80d are each configured for engaging a correspondingly shaped protrusions 24b, 24c on an inner circumferential surface of rotor 24 for non-rotatably connecting rotor 24 and rotor carrier 28 together. In other words, notches 76d, 80d engage protrusions 24b, 24c such that rotor carrier 28 rotates with rotor 24 about center axis CA during operation of electric motor 16. In this embodiment, as shown in FIG. 3b, notches 76d, 80d are formed as flats stamped into radially outer circumferential surface portions 76c, 80c, such that surface portion 76c is formed by at least one arc and surface portion 80c is formed by at least one arc. In the embodiment shown in FIG. 3b, portion 76 is provided with two notches 76d and surface portion 76c is formed by a plurality of circumferentially spaced apart arcs and portion 80 is provided with two notches 80d and surface portion 80c is formed by a plurality of circumferentially spaced apart arcs. In other embodiments, portions 76, 80 can include different amounts of notches and arcs. In the embodiment shown in FIGS. 2 to 4, notches 76d, 80d are radially outside of radially inner circumferential surface portion 78c of second portion 78, with radially innermost axially extending surfaces 76e, 80e of notches 76d, 80d being radially outside of radially inner circumferential surface portion 78c.

Rotor carrier 28 is stamped such that portions 76, 78, 80 each have approximately (+/−10%) a same radial thickness T. Accordingly, second portion 78 protrudes radially inward further than first and third portions 76, 80, such that an inner circumferential surface portion 92 of inner circumferential surface 28f at second portion 78 is further radially inward than inner circumferential surface portions 90, 94 of inner circumferential surface 28f at portions 76, 80. Inner circumferential surface portion 92 is configured for non-rotatably connecting to an outer circumferential surface of rotor flange 48 and outer circumferential surfaces of at least some of clutch plates 30. In the embodiment shown in FIGS. 2, 3a and 3b, inner circumferential surface portion 92 is non-rotatably connected to every other clutch plate 30. In preferred embodiments, inner surface portion 90 is provided with axially extending splines or teeth 32 configured for drivingly engaging axially extending splines or teeth on outer circumferential surface of rotor flange 48 and outer circumferential surfaces of clutch plates 30. Splines 32 each have a major diameter surface 32a, which defines an innermost circumferential surface of rotor carrier 28, and a minor diameter surface 32b.

Figure 4:
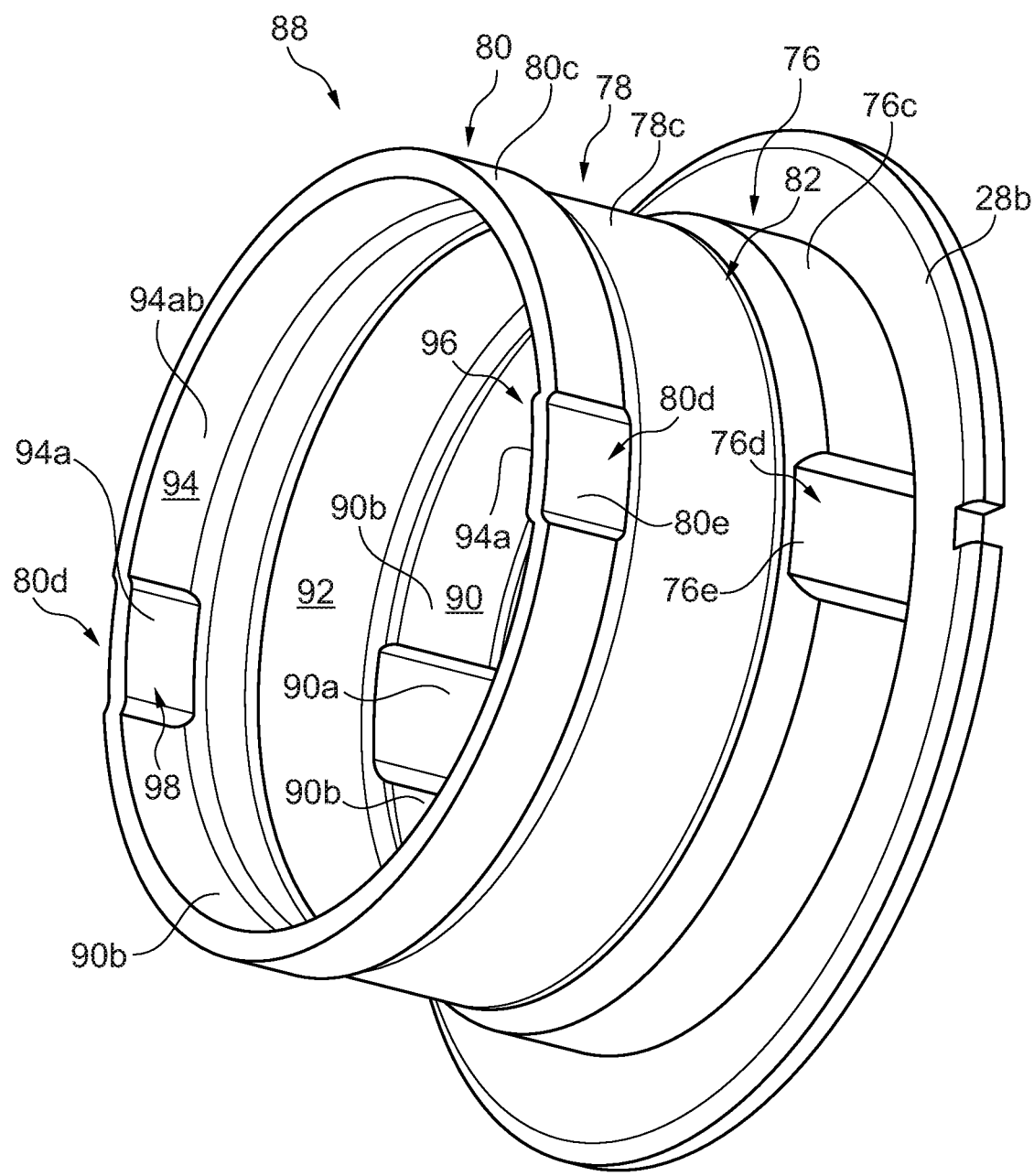
FIG. 4 shows a perspective view of an intermediate part for forming the rotor carrier shown in FIGS. 2 and 3.

FIG. 4 shows a perspective view of an intermediate part 88 created during the formation of rotor carrier 28, illustrating the configuration of notches 76d, 80d of first and second portions 76, 80, respectively, and annular groove 82 at second portion 78. As noted above, as shown in FIG. 4, radially outer circumferential surface portion 76c of first portion 76 and radially outer circumferential surface portion 80c of third portion 80 are positioned radially outside of radially inner circumferential surface portion 78c of second portion 78 such that second portion 78 is recessed with respect to portions 76, 80 at the outer circumferential surface of rotor carrier 28 so as to form annular groove 82 axially between first portion 76 and third portion 80 at the outer circumferential surface of rotor carrier 28.

FIG. 4 also shows how second portion 78 protrudes radially inward further than first and third portions 76, 80, such that an inner circumferential surface portion 92 of second portion 78, which is not yet provided with splines 32, is further radially inward than respective inner circumferential surface portions 90, 94 of portions 76, 80. More specifically, inner circumferential surface portions 90, 94 are formed of radially inner surface portions 90a, 94a, respectively, which formed by radially inwardly extending protrusions 96, 98 generated during the formation of notches 76d, 80d and thus radially aligned with notches 76d, 80d, and radially outer surface portions 90b, 94b, respectively. In this embodiment, protrusions 96, 98 are formed by stamping of radially outer circumferential surface portions 76c, 80c, such that radially outer surface portions 90b, 94b of inner circumferential surface portions 90, 94 are each formed by at least one arc. In the embodiment shown in FIGS. 2 to 4, portion 76 is provided with two protrusions 96 such that radially outer surface portions 90b is formed by two circumferentially spaced apart arcs and portion 80 is provided with two protrusions 98 such that radially outer surface portions 94b is formed by two circumferentially spaced apart arcs.

Intermediate part 88 is further processed to form rotor carrier 28. Splines 32 or teeth may be formed in inner circumferential surface 78d, radially extending section 28b may further shaped for fixing to front cover 31a and portion 80 may be further shaped to receive rotor clamping ring 74.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
D1 frontward direction 10 hybrid module
12 hybrid drive unit
14 torque converter
16 electric motor
18 engine connect/disconnect clutch
20 input shaft
22 stator
24 rotor
24a magnet segments
26 housing
28 rotor carrier
28a cylindrical axially extending section
28b radially extending section
28c first axial end
28d second axial end
28e outer circumferential surface
28f inner circumferential surface
29 fasteners
30 clutch plates
31 cover
31a front cover
31b rear cover
32 axially extending splines
32a major diameter surface
32b minor diameter surface
34 inner support
36 counter pressure plate
38 piston
40 spring
42 support plate
43 liftoff control plate
44 housing protrusion
46 ball bearing
48 rotor flange
50 impeller shell
50a rounded blade supporting portion
52 impeller
54 impeller blades
56 turbine
58 turbine shell
60 turbine blades
62 stator
64 damper assembly
66 support hub
68 friction material
70 outer radial extension
72 radially extending wall
74 rotor clamping ring
75a non-ferrous plate
75b non-ferrous plate
76 first portion
76a rear axial end
76b front axial end
76c radially outer circumferential surface portion
76d notches
76e radially innermost axially extending surfaces
78 second portion
78a rear axial end
78b front axial end
78c radially inner outer circumferential surface portion
80 third portion
80a rear axial end
80b front axial end
80c radially outer circumferential surface portion
80d notches
80e radially innermost axially extending surfaces
82 annular groove
84 radially extending channel
88 intermediate part
90 first inner circumferential surface portion
90a radially inner surface portions
90b radially outer surface portions
92 second inner circumferential surface portion
94 third inner circumferential surface portion
94a radially inner surface portions
94b radially outer surface portions
96 protrusions
98 protrusions

What is claimed is:

1. An electric motor comprising:
a stator;
a rotor; and
a rotor carrier radially inside of the rotor non-rotatably fixed to the rotor, the rotor carrier including an axially extending cylindrical section including an outer circumferential surface having an annular groove formed therein,
wherein the axially extending cylindrical section includes a first portion, a second portion and a third portion, the second portion being axially between the first portion and the third portion, the annular groove being formed at the second portion,
wherein an inner circumferential surface of the second portion includes teeth or splines that are radially aligned with the annular groove.

2. The electric motor as recited in claim 1 wherein the first portion, the second portion and the third portion are of approximately a same thickness.

3. The electric motor as recited in claim 1 wherein at least one of the first portion and the third portion includes a notch formed in the outer circumferential surface, the notch non-rotatably connecting the rotor carrier to the rotor.

4. The electric motor as recited in claim 3 wherein the at least one of the first portion and the third portion including the notch includes a radially outer circumferential surface portion circumferentially adjacent to and offset radially outwardly from the notch, the radially outer circumferential surface portion being formed by at least one arc.

5. The electric motor as recited in claim 4 wherein the notch is a plurality of notches and the at least one arc is a plurality of arcs, each of the first portion and the third portion including at least two of the plurality of notches and at least two of the plurality of arcs.

6. The electric motor as recited in claim 3 wherein the notch is formed as a flat.

7. The electric motor as recited in claim 1 wherein the second portion extends radially inward further than the first portion and the third portion.

8. The electric motor as recited in claim 1 wherein the third portion forms a free end of the rotor carrier and the rotor carrier includes a radially extending section adjoined to the first portion.

9. A hybrid module configured for arrangement in the torque path upstream from a transmission and downstream from an internal combustion engine, the hybrid module comprising:
the electric motor as recited in claim 1; and
a clutch including at least one clutch plate non-rotatably connected to the rotor carrier directly radially inside of the annular groove.

10. The hybrid module as recited in claim 9 wherein the rotor carrier includes a radially extending section at an axial end of the axially extending cylindrical section, the hybrid module further comprising a torque converter including a front cover, the rotor carrier being fixed to the torque converter by fasteners passing through the radially extending section of the rotor carrier.

11. The hybrid module as recited in claim 10 further comprising an input shaft configured for connecting to the internal combustion engine, the clutch being configured for selectively connecting the torque converter to the input shaft or disconnecting the torque converter from the input shaft.

12. A method of forming the electric motor recited in claim 1, the method comprising:
providing the stator and the rotor;
forming, by stamping, the rotor carrier including the axially extending cylindrical section including the outer circumferential surface having the annular groove formed therein; and
non-rotatably fixing the rotor carrier to the rotor radially inside of the rotor.

13. The method as recited in claim 12 wherein the axially extending cylindrical section includes a first portion, a second portion and a third portion, the second portion being axially between the first portion and the third portion, the annular groove being formed at the second portion,
wherein the first portion, the second portion and the third portion are of approximately a same thickness before and after the stamping.

14. The method as recited in claim 12 wherein the forming of the rotor carrier includes stamping a notch into the outer circumferential surface in at least one of the first portion and the third portion.

15. A method of forming a hybrid module comprising:
performing the method as recited in claim 12 to form the electric motor; and
fixing the rotor carrier to a cover of a torque converter, the torque converter including a turbine and an impeller configured for driving the turbine via fluid flowing from the impeller to the turbine.

16. The method as recited in claim 15 further comprising non-rotatably fixing at least one clutch plate to an inner circumferential surface of the axially extending cylindrical section of the rotor carrier directly radially inside of the annular groove,
wherein the cover of the torque converter includes a front cover, the rotor carrier including a radially extending section at an axial end of the axially extending cylindrical section, the fixing of the rotor carrier to the cover including fixing the front cover to the radially extending section.

17. The electric motor as recited in claim 1 wherein the teeth or splines are solely on the second portion.

18. An electric motor comprising:
a stator;
a rotor including a plurality of permanent magnet segments; and
a rotor carrier radially inside of the rotor non-rotatably fixed to the rotor, the rotor carrier including an axially extending cylindrical section including an outer circumferential surface having an annular groove formed therein, the outer circumferential surface of the rotor carrier contacting an inner circumferential surface of at least one of the permanent magnet segments,
wherein the axially extending cylindrical section includes a first portion, a second portion and a third portion, the second portion being axially between the first portion and the third portion, the annular groove being formed at the second portion,
wherein the first portion, the second portion and the third portion are of approximately a same thickness,
wherein an inner circumferential surface of the second portion includes teeth or splines that are radially aligned with the annular groove.

19. An electric motor comprising:
a stator;
a rotor including a plurality of permanent magnet segments; and
a rotor carrier radially inside of the rotor non-rotatably fixed to the rotor, the rotor carrier including an axially extending cylindrical section including an outer circumferential surface having an annular groove formed therein, the annular groove forming a gap for fluid to flow in contact with an inner circumferential surface of at least one of the permanent magnet segments,
wherein the axially extending cylindrical section includes a first portion, a second portion and a third portion, the second portion being axially between the first portion and the third portion, the annular groove being formed at the second portion,
wherein the first portion, the second portion and the third portion are of approximately a same thickness,
wherein the second portion extends radially inward further than the first portion and the third portion.

* * * * *